US008676973B2

(12) United States Patent  (10) Patent No.: US 8,676,973 B2
Isaacson  (45) Date of Patent: Mar. 18, 2014

(54) LIGHT-WEIGHT MULTI-USER BROWSER

(75) Inventor: Scott A. Isaacson, Kamuela, HI (US)

(73) Assignee: Novell Intellectual Property Holdings, Inc., Seattle, WA (US)

( * ) Notice: Subject to any disclaimer, the term of this patent is extended or adjusted under 35 U.S.C. 154(b) by 1136 days.

(21) Appl. No.: 11/370,516

(22) Filed: Mar. 7, 2006

(65) Prior Publication Data

US 2007/0214272 A1  Sep. 13, 2007

(51) Int. Cl.
G06F 15/173 (2006.01)
G06F 15/16 (2006.01)

(52) U.S. Cl.
USPC ............ 709/225; 709/223; 709/229; 709/240

(58) Field of Classification Search
USPC .......................................................... 709/225
See application file for complete search history.

(56) References Cited

U.S. PATENT DOCUMENTS

| | | | |
|---|---|---|---|
| 4,918,653 A | 4/1990 | Johri et al. | |
| 5,664,206 A | 9/1997 | Murow et al. | |
| 5,713,024 A | 1/1998 | Halladay | |
| 5,721,824 A | 2/1998 | Taylor | |
| 5,732,212 A | 3/1998 | Perholtz et al. | |
| 5,748,890 A | 5/1998 | Goldberg et al. | |
| 5,835,777 A | 11/1998 | Staelin | |
| 5,894,571 A | 4/1999 | O'Connor | |
| 5,901,227 A | 5/1999 | Perlman | |
| 5,950,010 A | 9/1999 | Hesse et al. | |
| 5,961,593 A | 10/1999 | Gabber et al. | |
| 6,144,959 A * | 11/2000 | Anderson et al. | 707/9 |
| 6,205,579 B1 | 3/2001 | Southgate | |
| 6,256,774 B1 | 7/2001 | O'Leary et al. | |
| 6,282,711 B1 | 8/2001 | Halpern et al. | |
| 6,301,707 B1 | 10/2001 | Carroll et al. | |
| 6,324,691 B1 | 11/2001 | Gazdik | |
| 6,353,926 B1 | 3/2002 | Parthesarathy et al. | |
| 6,367,075 B1 | 4/2002 | Kruger et al. | |
| 6,421,777 B1 | 7/2002 | Pierre-Louis et al. | |
| 6,457,130 B2 | 9/2002 | Hitz et al. | |
| 6,460,060 B1 * | 10/2002 | Maddalozzo et al. | 715/234 |
| 6,493,871 B1 | 12/2002 | Welch et al. | |
| 6,539,473 B1 | 3/2003 | Hubacher et al. | |
| 6,539,539 B1 | 3/2003 | Larsen et al. | |
| 6,606,744 B1 | 8/2003 | Mikurak | |

(Continued)

FOREIGN PATENT DOCUMENTS

GB  2419711  5/2006

OTHER PUBLICATIONS

"Firefox Help: How to Manage Profiles"; http://www.mozilla.org/support/firefox/profile; printed on Aug. 27, 2007; pp. 1-4.

(Continued)

Primary Examiner — Richard G Keehn
(74) Attorney, Agent, or Firm — Marger Johnson & McCollom PC

(57) ABSTRACT

A multi-user web browser is stored on a computer. The multi-user web browser permits more than one user to create and use a browser user account without requiring different users to log into different operating system user accounts. Instead, a browser user can log into the multi-user browser by providing a browser user name and browser password associated with the browser user name. This enables the multi-user web browser to support multiple users from within a single operating system user account.

38 Claims, 10 Drawing Sheets

(56) References Cited

U.S. PATENT DOCUMENTS

| | | | |
|---|---|---|---|
| 6,615,406 B1 | 9/2003 | Wong et al. | |
| 6,651,085 B1* | 11/2003 | Woods | 709/203 |
| 6,725,452 B1 | 4/2004 | Te'eni et al. | |
| 6,728,711 B2 | 4/2004 | Richard | |
| 6,735,757 B1 | 5/2004 | Kroening et al. | |
| 6,775,829 B1 | 8/2004 | Kroening | |
| 6,799,208 B1 | 9/2004 | Sankaranarayan et al. | |
| 6,892,382 B1 | 5/2005 | Hapner et al. | |
| 6,928,644 B1 | 8/2005 | Kroening et al. | |
| 6,981,028 B1* | 12/2005 | Rawat et al. | 709/217 |
| 7,006,993 B1* | 2/2006 | Cheong et al. | 705/38 |
| 7,013,461 B2 | 3/2006 | Hellerstein et al. | |
| 7,016,959 B2* | 3/2006 | Dinh et al. | 709/225 |
| 7,051,327 B1 | 5/2006 | Milius et al. | |
| 7,055,149 B2 | 5/2006 | Birkholz et al. | |
| 7,093,247 B2 | 8/2006 | Ashworth et al. | |
| 7,143,067 B1 | 11/2006 | Cheston et al. | |
| 7,177,859 B2 | 2/2007 | Pather et al. | |
| 7,181,768 B1 | 2/2007 | Ghosh et al. | |
| 7,185,047 B1 | 2/2007 | Bate et al. | |
| 7,222,218 B2* | 5/2007 | Dutt et al. | 711/125 |
| 7,251,812 B1 | 7/2007 | Jhanwar et al. | |
| 7,272,815 B1 | 9/2007 | Eldridge et al. | |
| 7,284,243 B2 | 10/2007 | Burgess | |
| 7,302,634 B2 | 11/2007 | Lucovsky et al. | |
| 7,350,075 B1 | 3/2008 | Eastham | |
| 7,353,533 B2 | 4/2008 | Wright et al. | |
| 7,356,679 B1 | 4/2008 | Le et al. | |
| 7,398,480 B2 | 7/2008 | Zimniewicz et al. | |
| 7,398,524 B2 | 7/2008 | Shapiro | |
| 7,424,617 B2* | 9/2008 | Boyd et al. | 713/176 |
| 7,478,381 B2 | 1/2009 | Roberts et al. | |
| 7,506,337 B2 | 3/2009 | Iyer | |
| 7,506,338 B2 | 3/2009 | Alpern et al. | |
| 7,539,978 B1 | 5/2009 | Haddox et al. | |
| 7,546,594 B2 | 6/2009 | McGuire et al. | |
| 7,571,427 B2 | 8/2009 | Wang et al. | |
| 7,574,706 B2 | 8/2009 | Meulemans et al. | |
| 7,853,609 B2 | 12/2010 | Dehghan et al. | |
| 2001/0023440 A1 | 9/2001 | Franklin et al. | |
| 2001/0029605 A1 | 10/2001 | Forbes et al. | |
| 2002/0007330 A1* | 1/2002 | Kumar et al. | 705/36 |
| 2002/0007380 A1* | 1/2002 | Bauchot et al. | 707/530 |
| 2002/0010757 A1* | 1/2002 | Granik et al. | 709/218 |
| 2002/0019879 A1* | 2/2002 | Jasen et al. | 709/240 |
| 2002/0100036 A1 | 7/2002 | Moshir et al. | |
| 2002/0147974 A1 | 10/2002 | Wookey | |
| 2002/0156877 A1 | 10/2002 | Lu et al. | |
| 2002/0162030 A1 | 10/2002 | Brezak et al. | |
| 2003/0014656 A1 | 1/2003 | Ault et al. | |
| 2003/0061202 A1 | 3/2003 | Coleman | |
| 2003/0115292 A1 | 6/2003 | Griffin et al. | |
| 2003/0121024 A1 | 6/2003 | Hill et al. | |
| 2003/0126214 A1 | 7/2003 | Oliszewski | |
| 2003/0131073 A1 | 7/2003 | Lucovsky et al. | |
| 2003/0149759 A1* | 8/2003 | Hetherington et al. | 709/223 |
| 2003/0172127 A1 | 9/2003 | Northrup et al. | |
| 2003/0182414 A1 | 9/2003 | O'Neill | |
| 2003/0195970 A1* | 10/2003 | Dinh et al. | 709/229 |
| 2003/0200149 A1 | 10/2003 | Gonzalez et al. | |
| 2003/0217123 A1 | 11/2003 | Anderson et al. | |
| 2003/0221190 A1 | 11/2003 | Deshpande et al. | |
| 2004/0003266 A1 | 1/2004 | Moshir et al. | |
| 2004/0006710 A1 | 1/2004 | Pollutro et al. | |
| 2004/0015946 A1 | 1/2004 | Te'eni et al. | |
| 2004/0025048 A1 | 2/2004 | Porcari et al. | |
| 2004/0049697 A1 | 3/2004 | Edwards, Jr. et al. | |
| 2004/0102182 A1 | 5/2004 | Reith et al. | |
| 2004/0196981 A1 | 10/2004 | Nakano et al. | |
| 2004/0205748 A1 | 10/2004 | Iyer | |
| 2004/0254976 A1* | 12/2004 | Malik et al. | 709/200 |
| 2005/0002057 A1 | 1/2005 | Oe | |
| 2005/0005152 A1 | 1/2005 | Singh et al. | |
| 2005/0081055 A1 | 4/2005 | Patrick et al. | |
| 2005/0097353 A1 | 5/2005 | Patrick et al. | |
| 2005/0120054 A1 | 6/2005 | Shulman et al. | |
| 2005/0125677 A1 | 6/2005 | Michaelides | |
| 2005/0132179 A1 | 6/2005 | Glaum et al. | |
| 2005/0132349 A1 | 6/2005 | Roberts et al. | |
| 2005/0134896 A1 | 6/2005 | Koga | |
| 2005/0246588 A1 | 11/2005 | Deng et al. | |
| 2006/0021065 A1 | 1/2006 | Kamperman et al. | |
| 2006/0047657 A1 | 3/2006 | Frieder et al. | |
| 2006/0059359 A1* | 3/2006 | Reasor et al. | 713/182 |
| 2006/0090208 A1 | 4/2006 | Smith | |
| 2006/0123101 A1 | 6/2006 | Buccella et al. | |
| 2006/0123414 A1 | 6/2006 | Fors et al. | |
| 2006/0137000 A1 | 6/2006 | Isaacson | |
| 2006/0155838 A1 | 7/2006 | Wu et al. | |
| 2006/0218544 A1 | 9/2006 | Chakraborty et al. | |
| 2006/0230124 A1 | 10/2006 | Belfiore et al. | |
| 2006/0265597 A1 | 11/2006 | Carey et al. | |
| 2006/0277542 A1 | 12/2006 | Wipfel | |
| 2007/0006205 A1 | 1/2007 | Kennedy et al. | |
| 2007/0111726 A1* | 5/2007 | Lambert et al. | 455/432.1 |

OTHER PUBLICATIONS

"XenFaq—Xen Wiki"; http://www.wiki.xensource.com/xenwiki/XenFaq; printed on Aug. 27, 2007; pp. 1-7.

Buytaert, Kris; "Linux Virtualization with Xen"; LinuxDevCenter.com; http://www.linuxdevcenter.com/pub/a/linux/2006/01/26/xen.html; Jan. 26, 2006; pp. 1-3.

Rosen, Rami; "Introduction to the Xen Virtual Machine"; LinuxJournal.com; http://www.linuxjournal.com/article/8540; Sep. 1, 2005; pp. 1-10.

Clark, Bryan; "A Moment of Xen: Virtualize Linux to Test Your Apps"; IBM.com; http://www-128.ibm.com/developerworks/linux/library/l-xen/; Mar. 15, 2005; pp. 1-6.

"A Third Phase of Internet Search"; http://getoutfoxed.com/bookprint/46; printed on Aug. 28, 2007; p. 1-2.

"Abstract"; http://getoutfoxed.com/bookprint/36; printed on Aug. 28, 2007; p. 1.

"Beyond Outfoxed"; http://getoutfoxed.com/bookprint/88; printed on Aug. 28, 2007; p. 1.

"Calculating Levels of Trust"; http://getoutfoxed.com/bookprint/112; printed on Aug. 28, 2007; pp. 1-2.

"Comparison to Existing Systems"; http://getoutfoxed.com/bookprint/47; printed on Aug. 28, 2007; pp. 1-3.

"Files & Processes"; http://getoutfoxed.com/bookprint/84; printed on Aug. 28, 2007; p. 1.

"How it Works"; http://getoutfoxed.com/bookprint/87; printed on Aug. 28, 2007; p. 1.

"Keeping Your Network Clean"; http://getoutfoxed.com/bookprint/108; printed on Aug. 28, 2007; p. 1.

"Novell ZENworks 7 Suite: Your Complete Identity-driven IT Resource Management Solution"; Novell, Inc. Product Guide; http://www.novell.com; (2006); pp. 1-11.

"Novell ZENworks Configuration Management: Complete Systems Management to Lower Your Total Cost of Ownership"; Novell, Inc. Product Guide; http://www.novell.com; (2007); pp. 1-11.

"Novell ZENworks Endpoint Security Management: Total Control from a Single Console"; Novell, Inc. Technical White Paper; http://www.novell.com; (2007); pp. 1-11.

"Novell ZENworks Orchestrator Virtual Machine Management Guide 1.1"; Novell, Inc.; http://www.novell.com; (2007); pp. 1-109.

"Novell ZENworks"; Wikipedia, the free encyclopedia; http://en.wikipedia.org/wiki/ZENworks; Printed on Aug. 28, 2007; pp. 1-3.

"Objections"; http://getoutfoxed.com/bookprint/35; printed on Aug. 28, 2007; p. 1.

"Objections"; http://getoutfoxed.com/bookprint/86; printed on Aug. 28, 2007; p. 1.

"Orchestrating the Data Center with Novell ZENworks"; Novell Solution Flyer; http://www.novell.com; (2007), pp. 1-4.

Tridgell, A. et al., "The rsync algorithm," retrieved at http://www.samba.org/rsync/tech_report/node2.html, Nov. 9, 1998, p. 1.

"Phishing, Spyware, Crapware, Adware"; http://getoutfoxed.com/bookprint/85; printed on Aug. 28, 2007; p. 1.

"Search & Browsing"; http://getoutfoxed.com/bookprint/83; printed on Aug. 28, 2007; p. 1.

(56) References Cited

OTHER PUBLICATIONS

"Small World Networks"; http://getoutfoxed.com/booklprint/62; printed on Aug. 28, 2007; pp. 1-2.
"Socially Aware Surfing and Shopping"; http://getoutfoxed.com/booklprint/73; printed on Aug. 28, 2007; p. 1.
"Tagging and Folksonomy"; http://getoutfoxed.com/booklprint/96; printed on Aug. 28, 2007; p. 1.
"Three Magic Ingredients"; http://getoutfoxed.com/booklprint/32; printed on Aug. 28, 2007; p. 1.
"What Outfoxed is Not"; http://getoutfoxed.com/booklprint/34; printed on Aug. 28, 2007; p. 1.
Adorno, Kerry, "Novell Delivers Industry's Most Comprehensive Systems Management Solution"; Novell, Inc.; http://www.novell.com/news/press/novell-delivers-industrys-most-comprehensive-systems-management-solution; Waltham, Massachusetts; Aug. 14, 2007; p. 1.
Aiken, Peter et al., Microsoft Computer Dictionary; Fifth Edition; Microsoft Press; 2002.
Bailey, E.C., Maximum RPM, Red Hat Inc., 2000, ISBN 1-888172-78-9, http://www.redhat.com/docs/books/max-rpm/index.html, pp. 1-565.
Cowan, Crispin, Arnold, Seth, Beattie, Steve, Wright, Chris, & Viega, John "Defcon Capture the Flag: Defending Vulnerable Code from Intense Attack"; USA; 2003, pp. 1-53.
Cowan, Crispin, Arnold, Seth, Beattie, Steve, Wright, Chris, & Viega, John, "Immunix & Defcon: Defending Vulnerable Code From Intense Attack"; Immunix; USA; 2003.
Cowan, Crispin, Beattie, Steve, Kroah-Hartman, Greg, Pu, Calton, Wagle, Perry, & Gligor, Virgil, "SubDomain: Parsimonious Server Security"; Proceedings of the 14th Systems Administration Conference; The Usenix Association; USA; 2000.
Forrest, Stephanie "Computer Immunnology"; ACM; Oct. 1997; pp. 88-96.
Fusco, John, "The Linux Programmer's Toolbox"; Prentice Hall; 2007; Chapter 5, "What Every Developer Should Know about the Kernel," pp. 222-224.
Garfinkel, Simson & Spaford, Gene, "Practical Unix & Internet Security"; Second edition; ISBN 1-56592-148-8; Apr. 1996; Chapters 3.1, 3.2,4.1,4.2.
James, Stan; "Outfoxed in a Nutshell"; http://getoutfoxed.com/nutshell; printed on Aug. 28, 2007; pp. 1-3.
James, Stan; "Outfoxed in a Nutshell: What does Outfoxed add to my Browser?"; http://getoutfoxed.com/nutshell/ node/106; printed on Aug. 28, 2007; pp. 1-3.
James, Stan; "What is Outfoxed?"; http://getoutfoxed.com/about; printed on Aug. 28, 2007; pp. 1-2.
Newham, C. et al., "Learning the Bash Shell," 2nd Ed., O'Reilly & Associates, 1998, p. 13.
Nemeth, Evi et al., "Linux Administration Handbook"; Prentice Hall; 2006; Chapter 12—TCP/IP Networking, pp. 276-277.
Silva, G.N., APT HOWTO, Chapter 5—Getting Information about packages, Aug. 2001, http://web.archive.org/web/20010911133902/http://www.debian.org/doc/manuals/apt-howto-ch-sourcehandling.en.html.
Silva, G.N., APT HOWTO, Chapter 6—Working with source packages, Aug. 2001, http://web.archive.org/web/20010911133902/http://www.debian.org/doc/manuals/apt-howto/ch-sourcehandling.en.html.
Tanenbaum, Andrew S., "Computer Networks"; Third edition; Prentice Hall; 1996; pp. 29, 44.
Tanenbaum, Andrew; "Modern Operating Systems"; Second edition; Prentice Hall, Upper Saddle River, NJ; 2001; pp. 753-757.
YourDictionary.com Remote boot, retrieved on Jan. 5, 2010 from https://www.yourdictionary.com/computer/remote-boot.
Bhuta et al., "A framework for identification and resolution of interoperability mismatchs in COTS based system", IEEE IWICCS, 2007, pp. 1-6.
Chapman et al., "Contemplating systemic software reuse in project centric company", ACM SAICSIT, 2008, pp. 16-26.
Gill et al., "Resuability issued in component based development", ACM, 2003, pp. 1-5.
Lymer et al., "Experience in using business scenarios to access COTS components in integrated solutions", ACM, 2005, pp. 1-15.

\* cited by examiner

125

New Web Browser Account Table

| User Names | Passwords |
|---|---|
| User 1 | pass |
| User 2 | my_password |
| User 3 | p@$$word |
| User 4 | Password 4 |

LIGHT-WEIGHT MULTI-USER BROWSER

FIELD OF THE INVENTION

This invention pertains to user accounts for Internet browsers, and more particularly to allowing multiple users to log into a browser while using the same operating system user account.

BACKGROUND OF THE INVENTION

Internet browsing has become a popular and indispensable use of computer technology. By using an Internet browser such as Mozilla® Firefox® or Microsoft® Internet Explorer, computer users are able to access web pages all over the Internet. (Mozilla and Firefox are registered trademarks of the Mozilla Foundation; Microsoft is a registered trademark of Microsoft Corporation in the United States and/or other countries.) Like many software applications, web browsers include settings and preferences to allow users to customize the look and feel, as well as the behavior of the application. Browser settings are typically saved in a file dedicated to the user logged into a computer operating system.

For example, a family's home computer can have operating system accounts set up for each member of the household. If the mother logs into the operating system and uses the browser on the computer, the browser can save her browsing history and preferences in an account set up by the operating system for her. If the father uses the browser on the computer in the mother's operating system user account, the father will be able to see the browsing history of the mother, and the browser settings will be according to the mother's preferences. But if the father logs into his own account in the computer's operating system and uses the browser, he will see the settings and history from when he last used the computer, regardless of whether or not he was the last user of the computer.

Some browsers have a profile feature that allows multiple profiles while in the same operating system user account. Each user profile can provide some difference in look and feel from other profiles. A user can create or change his or her user profile using a profile manager. The profile manager then displays existing profiles that are available for selection, or allows a user to create a new profile.

Most computer users do not know how to use profiles or even of the existence of profiles. Further, profiles do not completely separate data from other users. A browser starts up with the most recent profile, and a user must affirmatively change to a different profile. Users that do know about and use profiles must track which profile is currently being used and switch to another profile as appropriate. And the data of one profile is available to users of another profile.

Accordingly, a need remains for a way to log in and authenticate users into a web browser, without having to log into an operating system as a different user or use a separate profile manager, to address these and other problems associated with the prior art.

SUMMARY OF THE INVENTION

A multi-user web browser is stored on a computer allowing more than one user to create and use browser user accounts without requiring each user to log into a different operating system user account. Upon startup of the multi-user browser, a user is prompted to enter a browser user name and associated password. Until the multi-user browser receives a valid browser user name and password, the multi-user browser prevents users from using the browser to view content over the Internet. Receiving a browser user name and password enables the user to customize the browser settings for the logged in browser user without requiring the user to log into an operating system user account.

The foregoing and other features, objects, and advantages of the invention will become more readily apparent from the following detailed description, which proceeds with reference to the accompanying drawings.

BRIEF DESCRIPTION OF THE DRAWINGS

FIG. 3 shows the browser account table of FIG. 1 after the browser account creator of FIG. 2 has created a new account.

DETAILED DESCRIPTION OF THE PREFERRED EMBODIMENT

Figure 1:
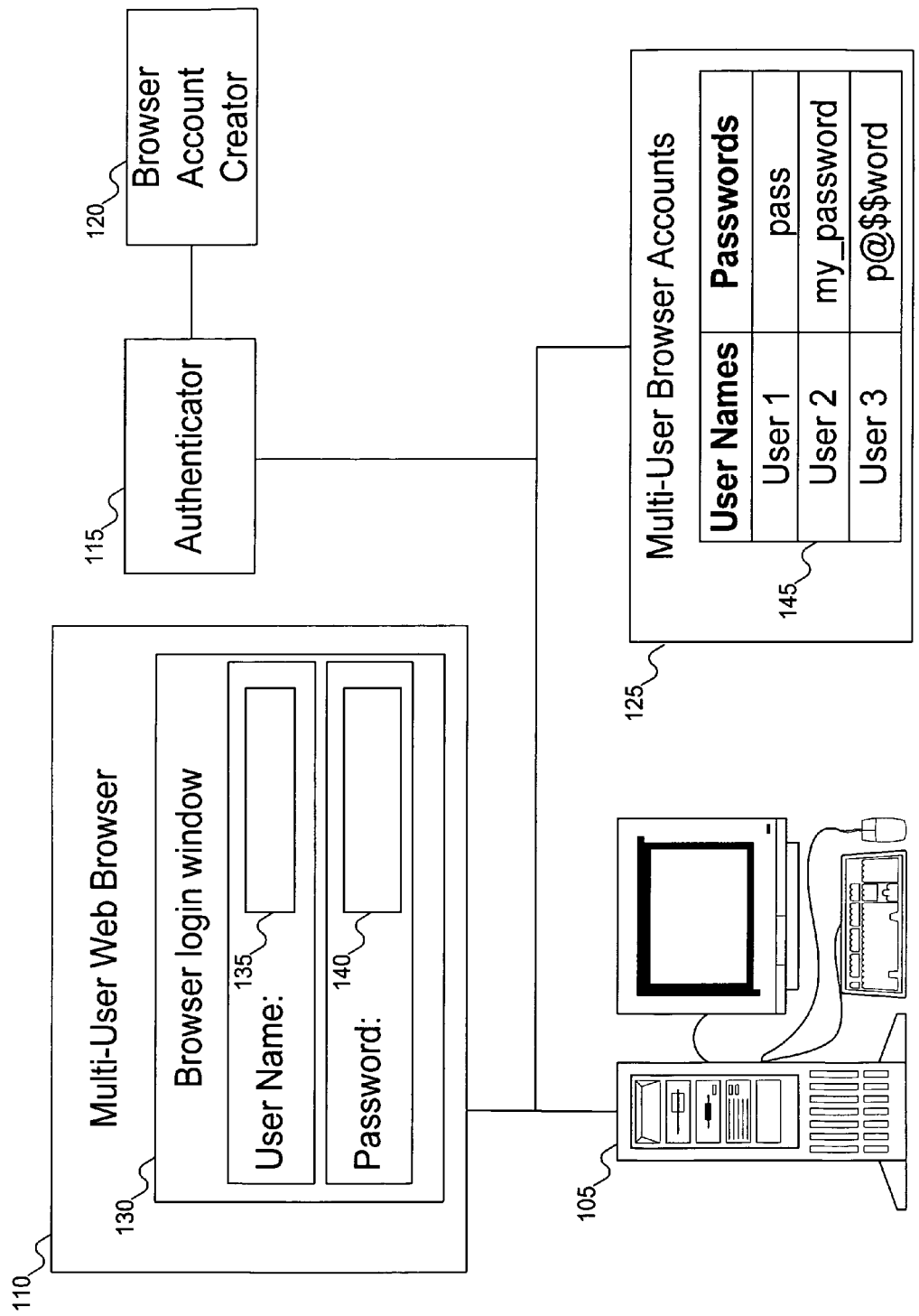
FIG. 1 shows a computer containing a multi-user web browser with browser user accounts, according to an embodiment of the invention.

FIG. 1 shows a computer containing a web browser with browser user accounts, according to an embodiment of the invention. Computer 105 includes all the typical elements of a computer, such as a central processor, memory, bus, disk space, etc. Also, computer 105 can be accessed locally by the user, or remotely over a network (not shown), such as a LAN, WAN, or the Internet, and can be reached via either a wired or a wireless (such as IEEE 802.11a/b/g/n, among others) connection.

In an embodiment of the invention, computer 105 includes a single user operating system, where the operating supports only a single operating system user account. In another embodiment, computer 105 includes an operating system supporting multiple users, including a default operating system user, often named "default" or "guest". A person skilled in the art will recognize that other user account names can represent a generic/default type user, and that there are no limitations on what the account is named.

Stored on computer 105 are multi-user web browser 110, authenticator 115, account creator 120, and browser accounts table 125. Multi-user browser 110 includes browser login window 130, where browser users can enter their browser user names and corresponding passwords. Other than browser login window 130, browser 110 behaves like standard web browsers, such as Microsoft Internet Explorer, Mozilla Firefox or other applications that are used to browse the network.

Like existing browsers that allow operating system users to customize browser settings, multi-user browser 110 allows user customization of options, including customization settings for general browser operation, privacy and security, content and downloading, connections, and other advanced options. A person skilled in the art will recognize that other types of settings can be customized by browser 110. The difference between multi-user browser 110 and existing browsers is that the customizations are now no longer tied to the user logged into the operating system, but instead are connected to the browser user that is logged into the multi-user browser.

In addition to customized settings, browser 110 can also save a web browsing history for the browser user. Browsing history can include visited web pages (e.g., visited URLs), bookmarked web pages, stored for information, stored passwords associated with particular web sites, cached pages and images, etc. A person skilled in the art will recognize other content that can also comprise browser history.

Looking at the customization options and other stored information, some of the options are merely a convenience, while other options implicate privacy or security concerns. For example, if one browser user saves his user name and password to a frequently accessed website, such an e-mail portal, then another user of the browser would be able to log into the first browser user's e-mail account and see e-mail that belongs to another person. Similarly, a browser user saving account information for access to his bank account would likely not want other subsequent users of the browser to have access to this personal information.

In the prior art, one solution for a browser user on a public computer (where more than one user can access and use the browser) was to not save any sensitive browser information for the user. The browser could be pre-configured to prevent any change to settings or storage of information, such as history or password information every time. In this case, users who frequently accessed the public computer had to re-enter all information every time they used the browser, even information which was merely based on user preferences and not implicating any privacy or security concerns.

Another prior art solution allowed settings to be changed, with users selectively determining what information to retain as browser history. This solution had the advantage that users could prevent sensitive information from being stored in a public browser, while allowing history and customization of information as a convenience. But each user has to confirm that the browser was configured in a desired manner. As most users were not likely to remember to check the settings, users might have inadvertently used the browser in a manner they did not want.

In an embodiment of the invention, browser 110 includes browser login window 130 to receive the browser user name and password. Browser login window 130 can be an initial web page of browser 110, a dialog box, or some other control that a user sees and completes before being able to view actual websites with browser 110. Browser login window 130 includes field 135 for a browser user to enter a user name, and field 140 for the browser user to enter a corresponding password. In one embodiment of the invention, the corresponding password can be blank. Although not shown in FIG. 1, browser login window can also include buttons or other controls to send the login information (i.e., browser user name and browser password) to be authenticated, to change or reset a password, to remind a user of a password, and/or to allow a user to create a new browser user account, according to embodiments of the invention.

While field 135 is shown in FIG. 1 as a text field allowing entry of a browser user name, a person skilled in the art will recognize that field 135 can also be a list of registered browser user names, or another type of field. Similarly, field 140 can be a secure field showing only asterisks or another character, rather than a standard text field, according to an embodiment of the invention. For additional security measures, field 140 can also be set up to be case sensitive, differentiating between received lowercase and uppercase letters, and can accept other characters, even non-displaying characters.

In an embodiment of the invention, authenticator 115 and account creator 120 work with account table 125 to ensure proper creation and logging in of browser users. Account table 125 includes a list of browser users with the corresponding passwords. In FIG. 1, account table 125 is shown as a simple table with a user name column and a password column. Account table 125 can be a table in a database, or other file format. Account table 125 can even have a different data structure, such as a linked list. Furthermore, while the passwords in account table 125 are shown in clear text, passwords can also be stored encrypted in another embodiment of the invention.

In an embodiment using accounts table 125, as a browser user logs into browser 110, authenticator 115 checks account table 125 to validate that the browser user name received in field 135 corresponds to an existing browser user account. For example, suppose a browser user enters "User 2" into field 135, and "a_password" into field 140. When checking to see if this is a valid browser user, authenticator 115 would identify User 2 in row 145 of browser account table 125. While in this embodiment, authenticator 115 validates that the browser user name exists in account table 125, it is also possible to have a validator distinct from the authenticator to validate the browser user.

Upon identification of the received browser user name, authenticator 115 then checks row 145 of browser account table 125 to see if the password received in field 140 matches the password for User 2. Recall that in this example, field 140 has received "a_password" as the entered password. When authenticator 115 compares "a_password" from field 140 to "my_password" from row 145 of browser account table, authenticator 115 recognizes that the received password is not correct and does not authenticate the browser user. In an embodiment of the invention, authenticator 115 can send a message back to browser login window 130 to inform the browser user that authentication was not successful, along with a reminder for the user to verify that the intended user name and password were entered in the browser user name field and password field.

Suppose the browser user then remembers that "a_password" is not the correct password, but that the correct password should be "my_password", and enters "my_password" into field 140, while keeping "User 2" in field 135. This time, authenticator 115 looks at row 145 of browser account table 125, and sees that "my_password" is the correct password for "User 2", and authenticates the browser user. Once the browser user is successfully authenticated, multi-user browser 110 then runs as a fully operable web browser, capable of visiting websites, and customization of browser settings, and so on.

In one embodiment of the invention, a browser administrator can configure the multi-user browser to have minimal or no password requirements. Some browser users might prefer the convenience of a short, easy to remember password over a password that might be difficult to guess. For example, a password consisting of only a few characters or an easily remembered word might be very easy to guess. Similarly, a user might even forego using a password and leave that field blank.

In an embodiment of the invention where simple or no passwords are used, browser account files can still be stored in a secure directory, preventing a browser user (other than the browser administrator) from accessing the files directly from the file system. For example, if one user knows the browser user name of another user and knows that the other user does not use a password, the first user can log into the other user's browser account. In the course of using the browser, the browser account settings can change for the user. However, because browser account files are stored in a secure directory, the files themselves are not in danger of being altered or deleted directly. The secure directory is discussed in greater detail below in reference to FIG. 4.

Figure 2:
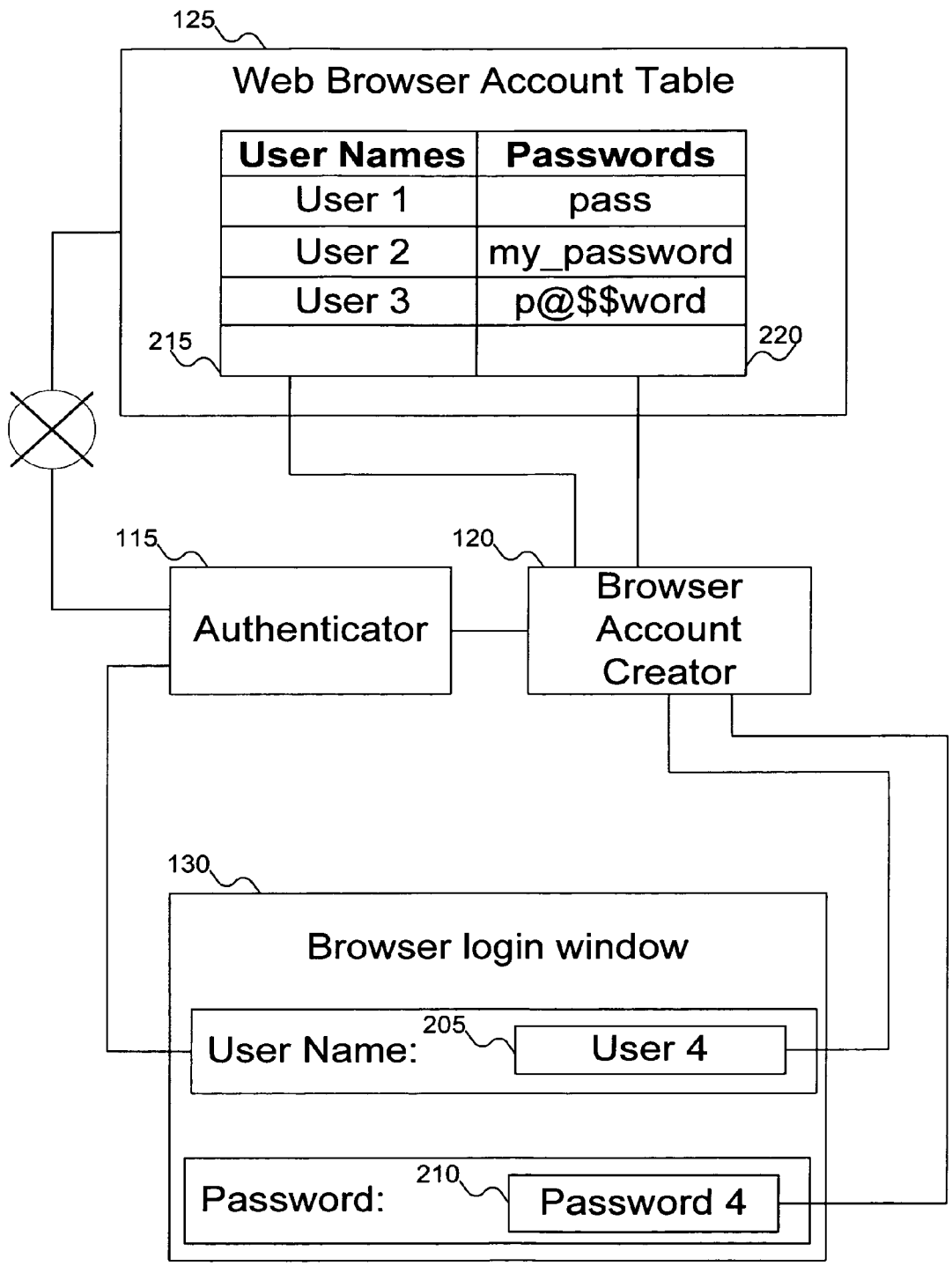
FIG. 2 shows a browser account creator, to create a new user account in the multi-user web browser of FIG. 1.

New browser user accounts are created with account creator 120. FIG. 2 shows a browser account creator to create a new user account for the multi-user web browser of FIG. 1. Browser login window 130 contains browser user name field 205 and browser password field 210. In the example of FIG. 2, a user has entered "User 4" in user name field 205 and "Password 4" in password field 210. Authenticator 115 then retrieves "User 4" from user name field 205 and looks for that browser user name in account table 125. After verifying that account table 125 does not include browser user name "User 4", browser account creator 120 then creates a new browser user account.

In one embodiment of the invention, browser account creator 120 notifies the user if a browser user account does not exist and asks the user if the entered browser user account should be created. Browser account creator 120 can then create the new account automatically using the user name and password entered in browser login window 130. In this embodiment, if a user has already created a browser user name, but mistakenly enters the wrong user name in user name field 205, the user can instead correctly re-enter the browser user name.

In another embodiment of the invention, browser login window 130 can include a button to create a new browser user account. In this embodiment, authenticator 115 is used to verify that the entered browser user name in field 205 does not already exist. If a user attempts to create a new browser user account with a name that already exists, authenticator 115 alerts the user that the browser user name is already taken. By alerting the browser user, the user can know to try entering a new browser user name.

After validating that the entered browser user name is available for a new browser user account, browser account creator 120 creates a new browser user account with the entered browser user name and password. Looking at FIG. 2, the new browser user name "User 4" from field 205, and "Password 4" from field 210 are placed into cell 215 and cell 220 of browser user account table 225. FIG. 3 shows browser account table 125 after browser account creator 120 of FIG. 2 has created a new account. In this example, "User 4" and "Password 4" have been added to row 305 in the table.

In an embodiment of the invention, the multi-user browser can remind browser users of their passwords if the users forget their passwords. For example, when browser accounts are created, in addition to providing a browser user name and password, the browser user can select a question and answer combination that can later help authenticate the browser user. Users can provide answers to such questions as their favorite color, the name of a pet, a mother's maiden name, name of elementary school, etc. In another embodiment of the invention, the extra authentication question can even be provided by the user (in addition to the answer.) The question and answer can be included in browser user account table 225. If only one question is used, then the question can be omitted from browser user account table 225.

In an embodiment where users can be reminded of their passwords, browser login window 130 can include a button or link for users who have forgotten their passwords. When browser users forget their passwords, the browser users are reminded of the authentication question, and asked to enter the answer to the question in an appropriate field.

For users that do forget their passwords, in one embodiment the user is told what the current password is (e.g., in an e-mail) so that the user can log into the browser with the current login information. In another embodiment, after authenticating with the question and answer, the user is logged in without further requirement of a password for that browsing session. In yet another embodiment, once the user is properly authenticated, the browser can clear the forgotten password from browser user account table 225 and permit the user to enter a new password.

In another embodiment of the invention, while a browser user is logged in the browser, the user can change his or her browser login information stored in browser user account table 225. For example, users can change the passwords associated with the browser accounts. Where a user has answered an authentication question (for when passwords are forgotten), the user can similarly change the answer to the question. In addition, where the user supplies the question for account authentication, or where the user selects one question from a list of available questions, the user can even change the question that is asked.

Figure 4:
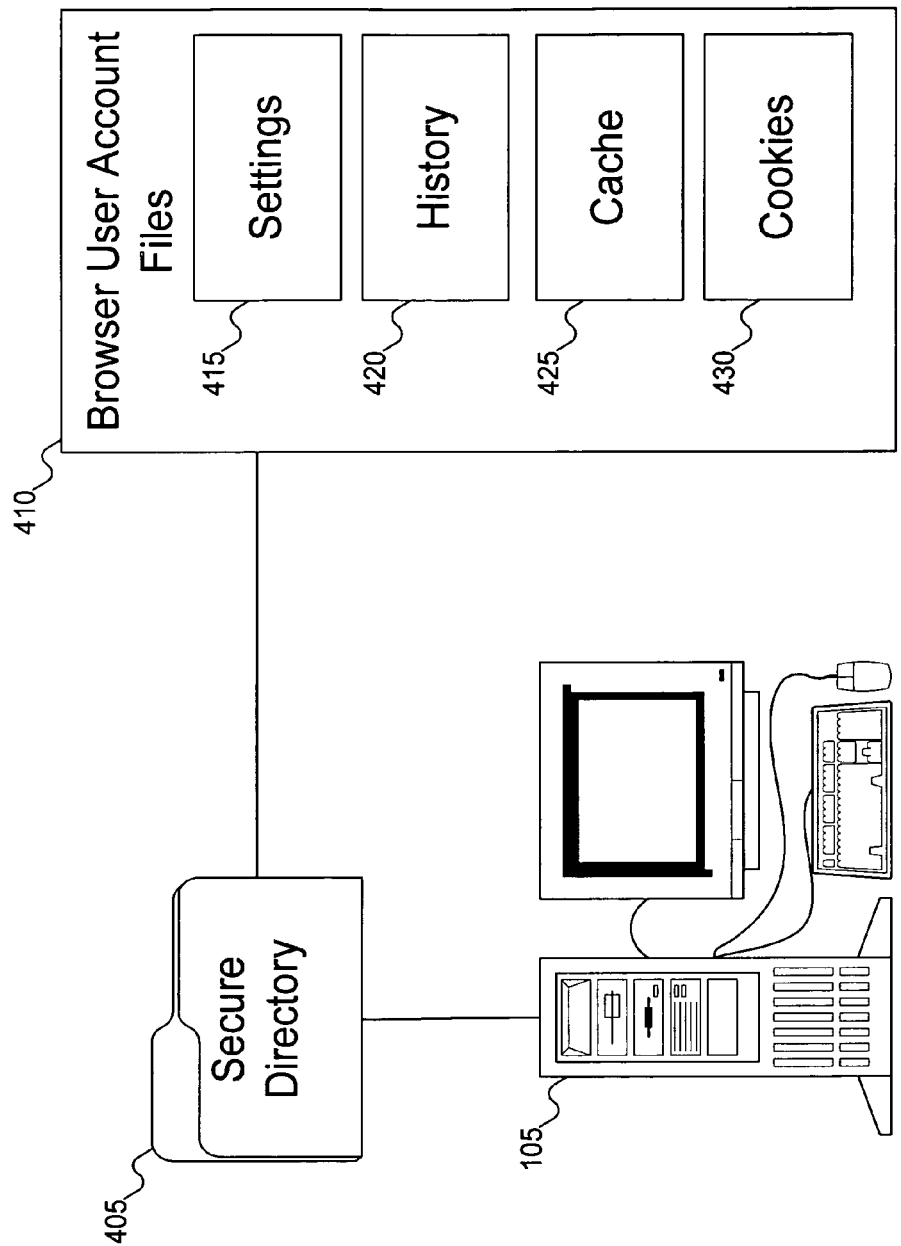
FIG. 4 shows browser user account files in a secure directory stored on the computer of FIG. 1.

FIG. 4 shows the browser user account files in a secure directory stored on the computer of FIG. 1. In the prior art the browser account files were stored in a subdirectory dedicated for the use of the user of the operating system. Then, each user's browser files are accessible only by that user; another operating system user would be prevented from accessing the first user's files. For example, suppose OS_user1 and OS_user2 are users who share a computer. When OS_user1 is logged into the computer operating system, then OS_user1 can access his browser files via the directory system. However, even if OS_user2 also has browser files stored on the computer, OS_user1 is not able to access the browser files for OS_user2 while logged into the operating system as OS_user1.

In an embodiment of the invention, the file system of computer 105 includes secure directory 405. Secure directory 405 can be set up so that only an operating system administrator or other authorized user can access the directory through the file system on the computer. For example, if an administrator is logged into an administrator operating system account, the administrator can access all directories on the computer using the typical file system means provided by the operating system. By entering the path of the directory, the administrator can see what files exist for a browser user. Where a browser account file is a standard file format, such as a cookies file stored as a text file, the administrator can access the content of the file. Other browser account files in a proprietary file format might require an additional application for the administrator to view the data in the file, although the administrator can still view such information as what files exist for a user, file size, and timestamp information.

However, browser users (including a user that is presently logged into the multi-user browser) are prevented from accessing secure directory 405 via the file system. In an embodiment of the invention, all directories on computer 105 can be secure, preventing browser users from access to any directories and files on computer 105. A person skilled in the art will recognize that there are other ways of preventing browser users from being able to access the files on secure directory 405: for example, by locking the account so a user cannot switch from the browser to another application.

Browser user account files 410 that are stored in secure directory 405 can include browser account settings 415, browser history 420, browser cache 425, and cookies 430. A person skilled in the art will recognize that the different browser account content can be stored in as few as one browser account file, but can also be several different files storing browser user account files 410. For example, browser settings 415 can be stored in a file or a directory separate from the other files in browser account data.

The same is true with the other files in browser user account files 410. In an embodiment of the invention, cache 425 is stored in a cache directory in secure directory 405. The cache directory can then store as many files of cache as necessary. Cache files 425 can includes cached web pages the browser user has visited before, as well as cached images from those web pages. A person skilled in the art will recognize that other information can also be cached.

In an embodiment of the invention, settings file 415 stores browser user preferences for the browser user account. Preferences can includes such information as browser look and feel (e.g. skins), privacy and security settings, and other preferences such as connection information or content. For example, privacy settings can include information on how long the browser is to retain history and cache. Security settings can include whether or not cookies should be enabled. Content settings can include what types of content the user wants to see. For example, a user can prefer that pop up ads are blocked generally, but then list web sites for which pop ups should be allowed.

In an embodiment of the invention, default settings can be used to initialize settings 415 when a user first creates a browser user account. The default settings can be created by a browser administrator, which is described below with reference to FIG. 6. Some default settings can be changed by the browser user after a browser account has been created, while other default settings can be fixed globally and not be changed for a user. For example, an administrator might select a maximum size for cache that the browser user is unable to override.

Figure 5:
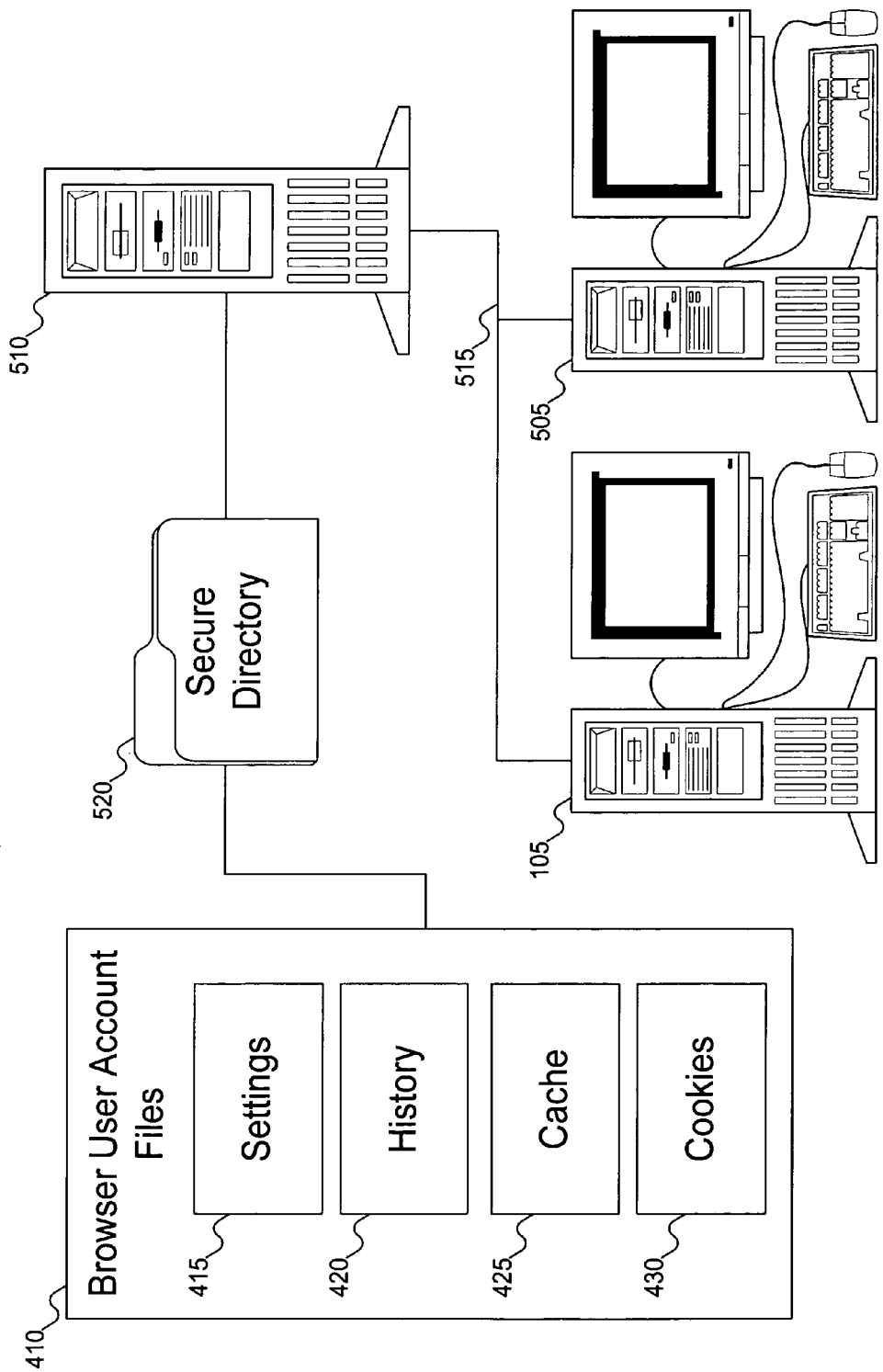
FIG. 5 shows browser user account files in a secure directory stored on a network server, according to an embodiment of the invention.

FIG. 5 shows browser user account files in a secure directory stored on a network server, according to an embodiment of the invention. In this embodiment, computer 105 and computer 505 are browser account clients networked with server 510. Network 515 can be any type of network, such as a LAN, WAN, the Internet, etc., and can be implemented as a wired or a wireless (such as IEEE 802.11a/b/g/n, among others) connection, or some combination thereof.

Browser users can log into a multi-user web browser at either computer 105 or computer 505. Just as in previously described embodiments, computer 105 and computer 505 are typically logged into an operating system account for a default operating system user. In this example, the web browser application itself can be stored on each client computer, while browser user account files 410 are instead stored in secure directory 520 on server 510. This embodiment is useful for environments where there are multiple client computers available for browser access. By storing browser user account files 410 on server 510, a user who has set up a browser user account does not need to return to the same client computer where the account was created in order to benefits from having a browser user account. For example, if a public library has several computers with multi-user browsers networked together, a user that has created a browser user account while at one computer in the library network will be able to access the browser user account on all computers in the library network.

Figure 6:
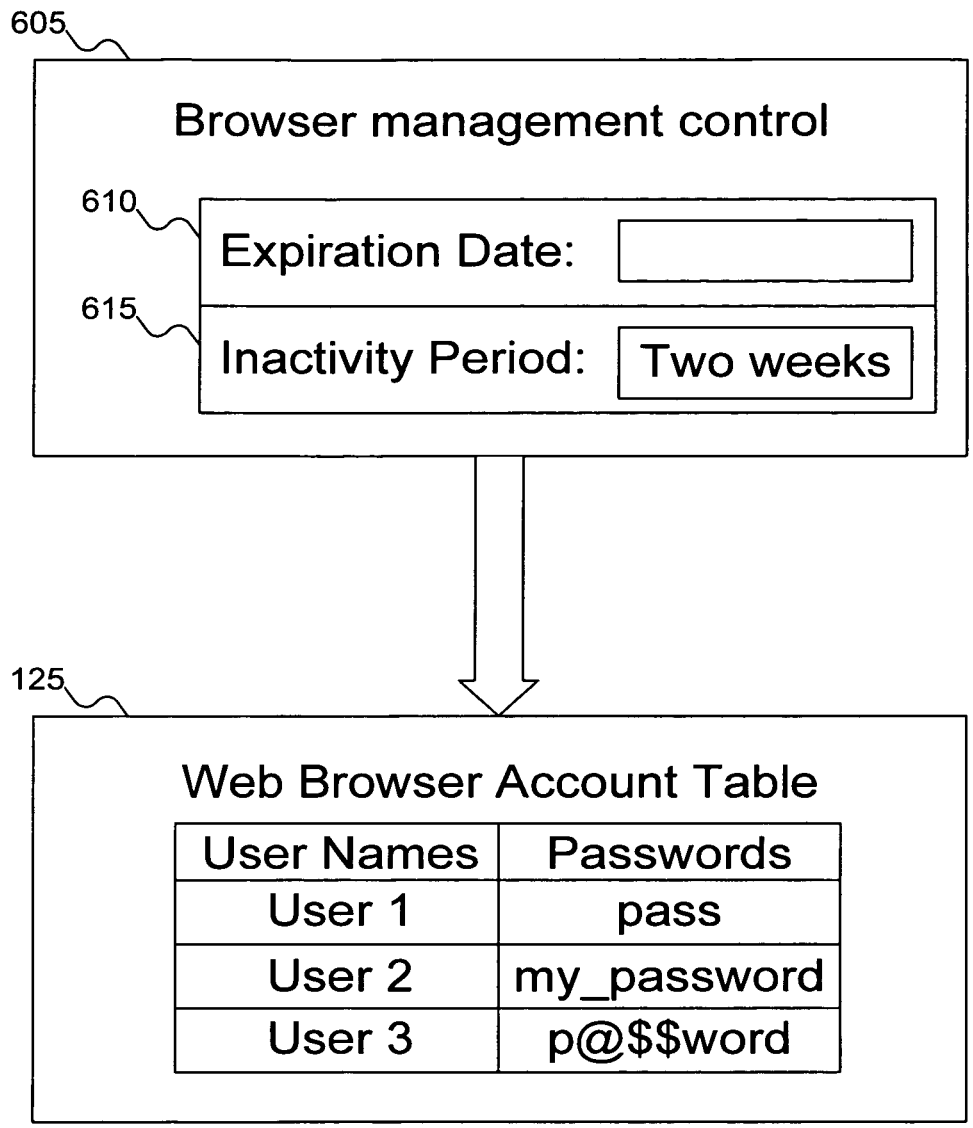
FIG. 6 shows a browser account administrator program with browser management controls to manage browser user accounts as in FIGS. 4 and 5.

FIG. 6 shows software to administer a browser account with browser management controls to manage all browser user accounts, according to an embodiment of the invention. Using browser management control 605, a browser account administrator can manage all browser user accounts in the system, as represented by browser account table 125. In addition to creating default settings for browser user accounts, a browser account administrator can also create global settings to apply to all browser user accounts.

In the example of FIG. 6, browser management control 605 contains expiration date field 610 and inactivity field 615 to control deletion of browser user accounts. Although it is useful to preserve browser user accounts, it might not be desirable to retain browser user accounts forever. Suppose, for example, that a public library provides free access to multi-user web browsers. Some users might be individuals who frequently visit the library to use their web browser accounts. There might also be other users who are only interested in using the multi-user browser account one time. Such one-time users might be persons traveling through town, or persons who have gone to the library while their home Internet connections were down. In the case of a one-time (or even short-time) browser user, maintaining a browser user account permanently would mean keeping storage of information that is never going to be accessed again.

In an embodiment of the invention, expiration date field 610 allows an administrator to enter a time period to preserve a browser user account after the browser account is created. For example, if the administrator enters six months into expiration date field 610, then six months after an account is created, the account expires. Inactivity period field 615 enables an administrator to specify a time period where a browser user account expires after the browser account has been inactive for that time period. A person skilled in the art will recognize that there can be other ways to manage expiration of browser user accounts When using both expiration date field 610 and inactivity period field 615, dates associated with browser user accounts are stored along with other browser account information. For example, an account creation date can be associated with the account so that it can be calculated when the time period of expiration date field 610 has lapsed. Similarly, a date indicating when a browser user last accessed the browser account enables a calculation of how long it has been since the browser account has been inactive. The dates can be simply dates associated with files in browser user account file or can be stored separately.

As browser accounts expire, browser account files can be deleted from the secure directory. Also, the browser user name and password can be removed from the browser account table. This way, in the future if the user wants to create another browser account using the same browser user name, the user name will be available for registration.

In addition to setting expiration settings and other settings that only administrators have access to, browser management control 605 can enable administrators to set up default settings to apply to browser user accounts as the browser account is created. In an embodiment of the invention, an administrator can access browser management control 605 by logging into the multi-user browser as the browser administrator. As browser users can access and modify their browser settings, the browser administrator can similarly access and modify browser settings used as default settings applied to accounts as new browser accounts are created. Then when a browser user creates a new browser account, the browser account is initialized with the default browser settings.

Figure 7A:
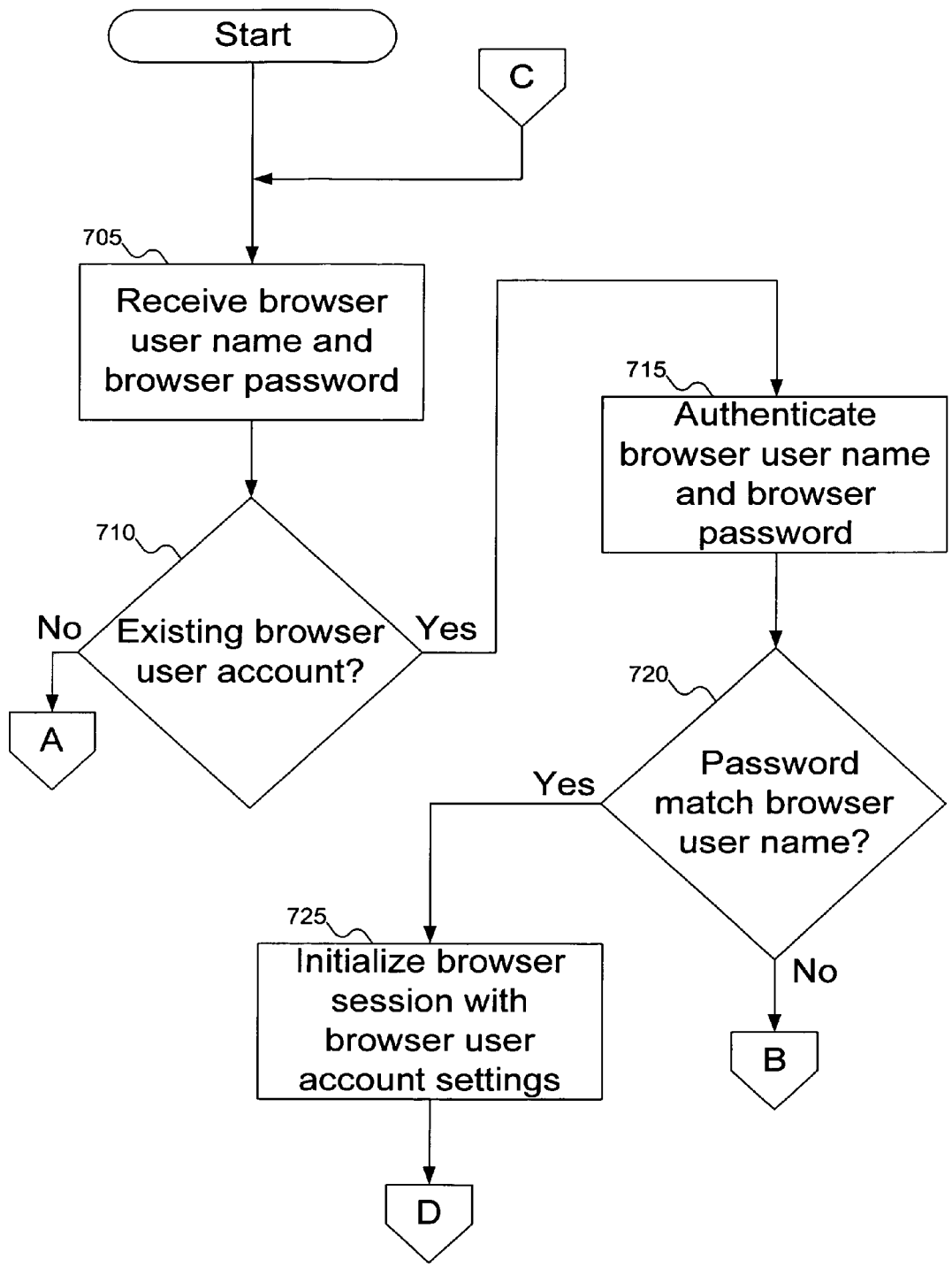
FIGS. 7A-7C is a flowchart showing the steps for logging in and using the multi-user web browser of FIG. 1.
Figure 7B:
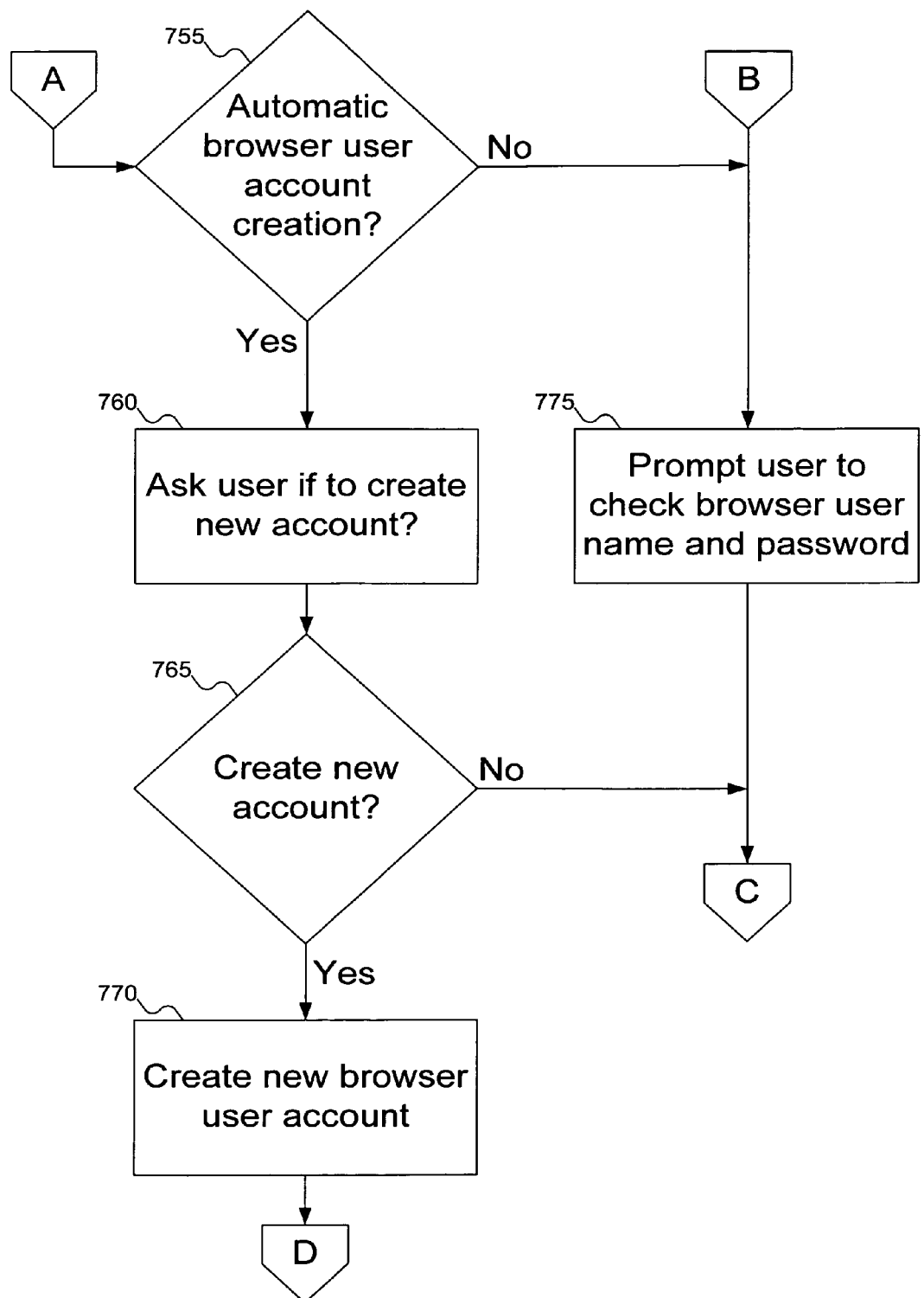
Figure 7C:
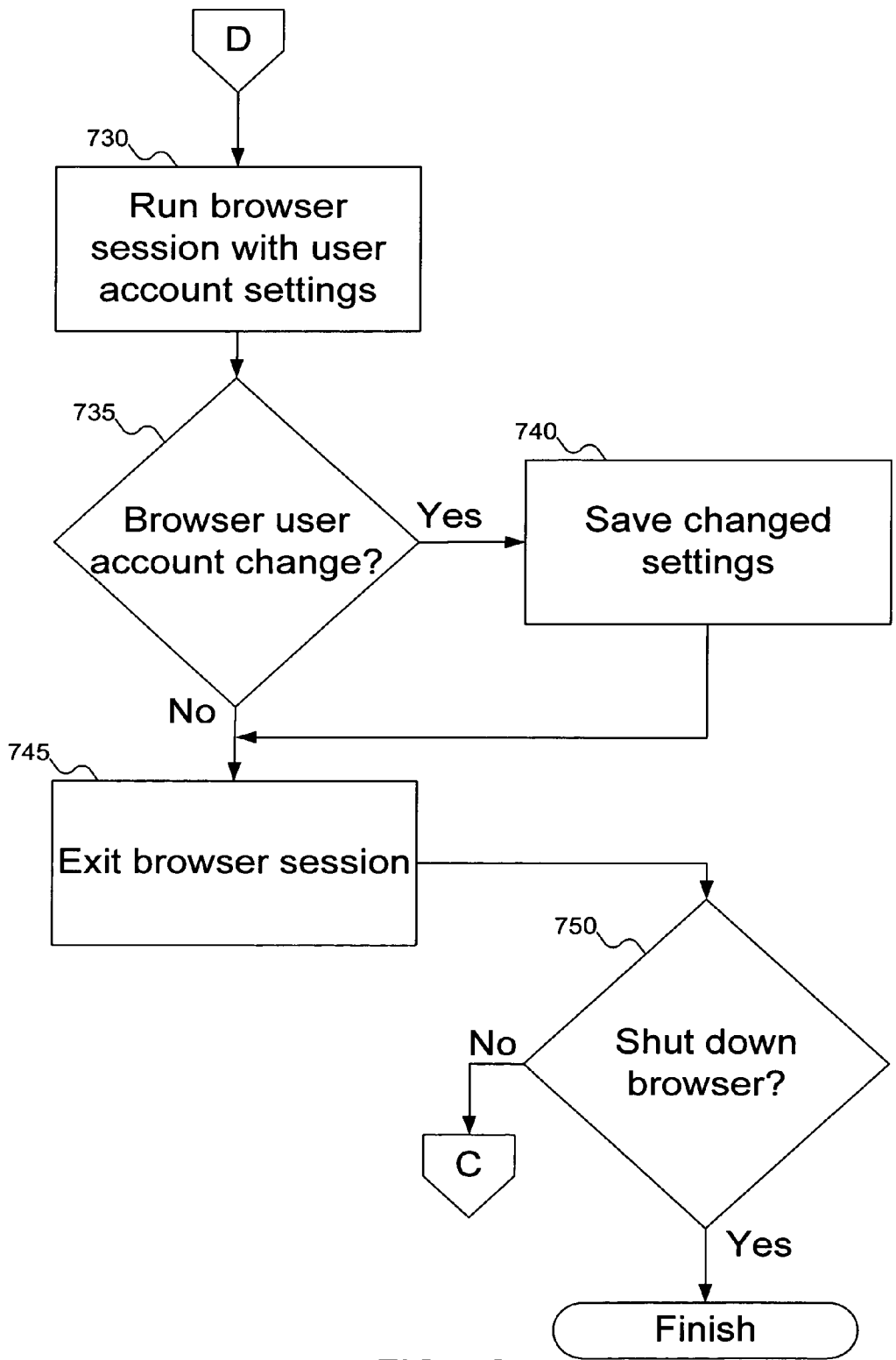

FIGS. 7A-7C show a flowchart of the steps for using the multi-user web browser of FIG. 1. In FIG. 7A, at step 705, the multi-user browser receives a browser user name and browser password. In an embodiment, the multi-user browser can request this information using an initial webpage before allowing more use of the multi-user browser. In another embodiment, this information can be obtained via a dialog box. A person skilled in the art will also recognize that there are other ways to receive a browser user name and browser password.

At step 710, the browser checks a user account table to see if the browser user name exists as a browser user account. If the browser user account is identified as an existing account, then at step 715 the multi-user browser authenticates the browser user name and browser password. Then, if at step 720 the received password corresponds to the received browser user name, at step 725 the browser session is initialized with the browser user account settings.

After the browser session is initialized, at step 730 (FIG. 7C) the browser session is run for the logged in browser user. If at step 735 there are changes to the browser user account, those changes are saved at step 740. For example, settings can change if the user goes into the browser preferences and selects different preferences other than the default preferences. Browser history and cache information can change when the user visits different web pages. Similarly, if the user changes his or her bookmarks, these are also saved. A person skilled in the art will recognize that there are other ways that the browser user account can change during the browser session. While this flowchart shows the browser user account settings saved just before exiting, it is also possible for the changes to the browser user account to be saved as the changes occur. After saving the browser account changes or if there are no browser account changes, the browser session is exited at 745.

At step 750, if the browser is configured to close after exiting a browser user session, the process is complete. If the browser remains open to receive another browser user login, then the flowchart returns to step 705 (FIG. 7A) to receive another browser user name and browser password.

Returning to step 710, if the entered browser user name is not found in the browser user account table, then the flowchart proceeds to step 755 (FIG. 7B) and determines if the multi-user browser is configured for automatic browser user account creation.

If the browser user accounts can be automatically created, then at step 760 the user is asked if he or she would like to create the browser account with the entered browser user name and password. If at step 765 the browser user account is to be created, then the browser user account is created at step 770. In an embodiment of the invention, when a browser user account is created, the browser user name and corresponding password (possibly encrypted) are stored in a browser user account table, indicating that a browser user account has been created. Also created initially are the browser account settings such as the default settings to apply to newly created browser user accounts. Similarly, there can be a default set of bookmarks set up on the creation of a browser user account. Because there is typically no default browser history, cookies, or cache, there might not be content in these files created when the browser user account is created. However, the files to store this data can be created while creating the browser user account. After creating the new browser user account, the browser user can use the browser as described above with respect to step 730 on FIG. 7C.

If at step 755 the browser is not set up for automatic browser user account creation, then at set 775 the user is prompted to check that the entered browser user name and password are correct before returning to step 705 (FIG. 7A). If at step 765 the user indicates that a new browser user account should not be created (for example perhaps the user simply misspelled an existing browser user name), then the flowchart also returns to step 705 (FIG. 7A).

Not shown in the flowchart is an embodiment of the invention where the browser login window used in step 705 to receive a browser user name and password can also include a button, link, or other control to create a new browser user account. Users clicking this control to create a new account can go to a different window or dialog where new browser account information is received. This information includes browser user name and password. A create new browser account dialog or window can also allow browser users to enter the password twice (verifying that the password entered is the intended password) and/or provide other information to identify the user in the event the user forgets his or her password.

Figure 8:
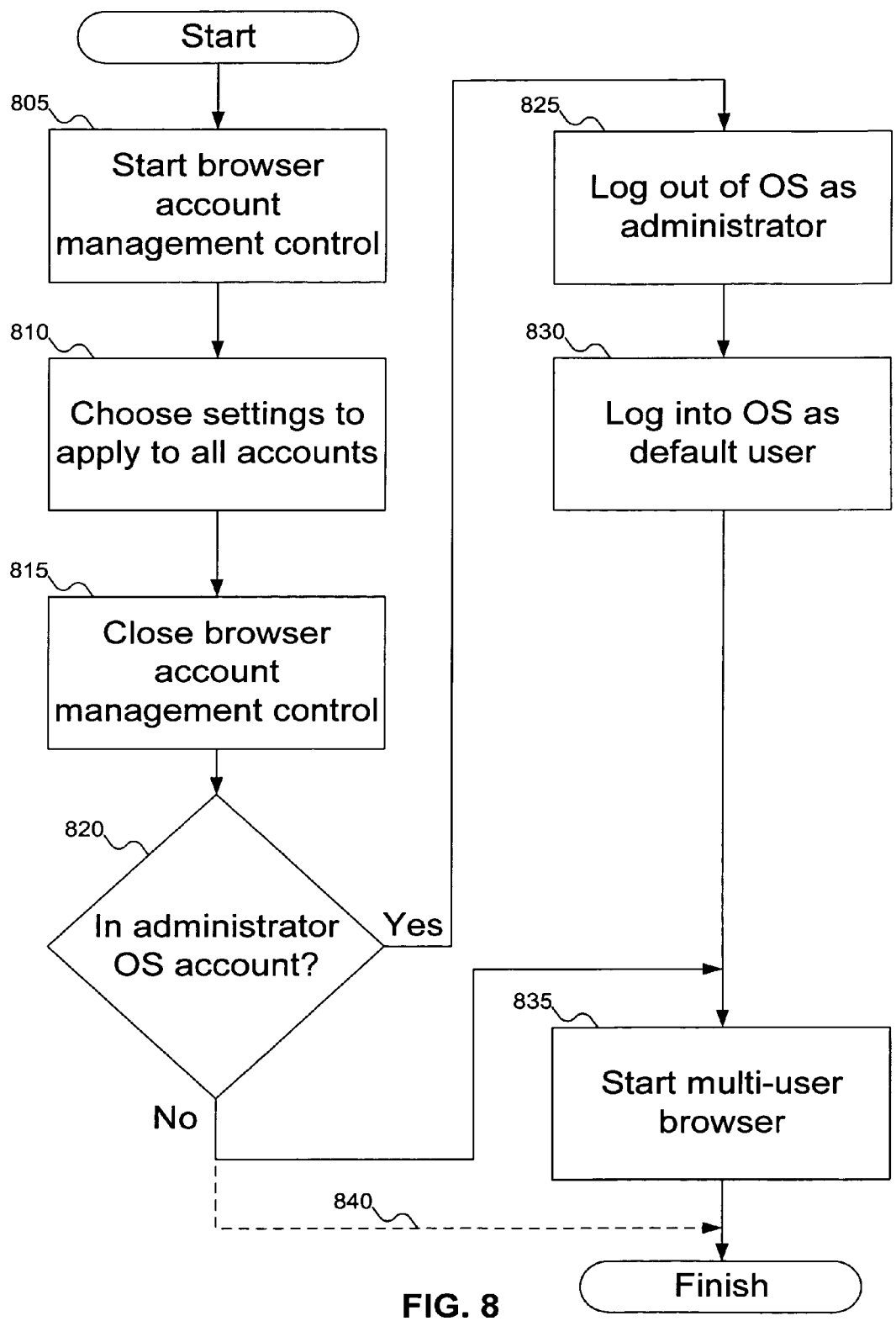
FIG. 8 is a flowchart showing the steps used by a browser account administrator to manage browser user accounts in the computer of FIG. 1 on the secure directory of FIG. 5.

FIG. 8 is a flowchart showing the steps used by a browser account administrator to manage all browser user accounts in the computer of FIG. 1. At step 805, the browser account administrator starts the browser account management control. In one embodiment of the invention, the browser account management control is a stand alone application. In another embodiment the browser account management control is a tool available from the multi-user browser. In either embodiment, in order to access the browser account management control, the administrator is identified as the administrator with privileges to manage all browser user accounts. For example, if the browser account management control is a stand alone application, the administrator can log into the multi-user browser as the browser administrator to access the account management control. In embodiment where the browser account management control is a stand alone application, the administrator can log into the operating system as the administrator before running the account management control.

After starting the browser account management control, at step 810 settings are selected. The settings chosen here can be applied to all browser user accounts. For example, one type of setting can control how long to retain a browser user account after the account has been created. Another control can include how long to preserve a browser user account after the account has been inactive. In one embodiment, these types of controls are applied to all user accounts, where the browser user is not able to override the settings. In another embodiment, a user browser can override some (or all) of these settings, as desired: for example, to prevent any history retention or to store passwords for the user.

Once the account settings have been selected, at step 815 the browser account management control is closed. If, at step 820, the active operating system user account is not the default user account for the multi-user browser, then the administrator logs out of the current operating system at step 825. Then, at step 830, the administrator logs into the operating system as the default user, and at step 835 the multi-user browser is started.

If at step 820, the operating system user is the default user, then if the browser management control is an application outside of the browser, the multi-user browser is started at step 835. Once the multi-user browser is been started, step 705 from FIG. 7A will then allow browser users the opportunity to log onto the multi-user browser, or create a new browser account.

As previously discussed, it is also possible that the browser account management control is a tool within the multi-user browser itself. In this instance, it is not necessary to start the multi-user browser for users as the browser is already running so the flowchart proceeds along arrow 840 and finishes.

This sequence of resolving conflicts is just one possible approach. A person skilled in the art will recognize that the conflict resolver can enable user configuration before automatically resolving the conflict. For example, some users might wish to have as much control over the converted VM instances as possible.

The following discussion is intended to provide a brief, general description of a suitable machine in which certain aspects of the invention may be implemented. Typically, the machine includes a system bus to which is attached processors, memory, e.g., random access memory (RAM), read-only memory (ROM), or other state preserving medium, storage devices, a video interface, and input/output interface ports. The machine may be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, or a system of communicatively coupled machines or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine may include embedded controllers, such as programmable or non-programmable logic devices or arrays, Application Specific Integrated Circuits, embedded computers, smart cards, and the like. The machine may utilize one or more connections to one or more remote machines, such as through a network interface, modem, or other communicative coupling. Machines may be interconnected by way of a physical and/or logical network, such as an intranet, the Internet, local area networks, wide area networks, etc. One skilled in the art will appreciated that network communication may utilize various wired and/or wireless short range or long range carriers and protocols, including radio frequency (RF), satellite, microwave, Institute of Electrical and Electronics Engineers (IEEE) 802.11, Bluetooth, optical, infrared, cable, laser, etc.

The invention may be described by reference to or in conjunction with associated data including functions, procedures, data structures, application programs, etc. which when accessed by a machine results in the machine performing tasks or defining abstract data types or low-level hardware contexts. Associated data may be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, etc. Associated data may be delivered over transmission environments, including the physical and/or logical network, in the form of packets, serial data, parallel data, propagated signals, etc., and may be used in a compressed or encrypted format. Associated data may be used in a distributed environment, and stored locally and/or remotely for machine access.

Having described and illustrated the principles of the invention with reference to illustrated embodiments, it will be recognized that the illustrated embodiments may be modified in arrangement and detail without departing from such principles. And although the foregoing discussion has focused on particular embodiments, other configurations are contemplated. In particular, even though expressions such as "according to an embodiment of the invention" or the like are used herein, these phrases are meant to generally reference embodiment possibilities, and are not intended to limit the invention to particular embodiment configurations. As used herein, these terms may reference the same or different embodiments that are combinable into other embodiments.

Consequently, in view of the wide variety of permutations to the embodiments described herein, this detailed description and accompanying material is intended to be illustrative only, and should not be taken as limiting the scope of the invention. What is claimed as the invention, therefore, is all such modifications as may come within the scope and spirit of the following claims and equivalents thereto.

The invention claimed is:

1. An apparatus, comprising:
a computer;
a multi-user web browser stored on the computer, accessible by a plurality of users within a single operating system account on the computer;
a plurality of browser user accounts for the multi-user web browser for each of the plurality of users, each browser user account storing information about a user's use of the multi-user web browser;
a browser management control, wherein the browser management control is started by a browser account administrator, wherein the browser account administrator is logged into the single operating system account as the administrator, wherein the browser account administrator uses a stand-alone application separate from the multi-user web browser to choose settings to apply to each of the plurality of browser user accounts, then closes the browser account management control and stand-alone application, then logs out of the single operating system account as the administrator, then logs into the single operating system account as a default user before starting the multi-user web browser;
a secure directory on the computer to store each of the plurality of browser user accounts separately from other browser user accounts, wherein the secure directory prevents access to non-administrator users of the computer;
a browser user name for each browser user account; and
a password associated with each of the browser user names.

2. An apparatus according to claim 1, further comprising:
a validator on the computer to validate the browser user name; and
an authenticator on the computer to authenticate that the password corresponds to the browser user name,
wherein the apparatus is operative to load a user's browser user account before a browser session is initialized.

3. An apparatus according to claim 1, further comprising a user account creator to establish a new user account for the multi-user web browser on the computer.

4. An apparatus according to claim 3, wherein the user account creator includes a validator to validate that the browser user name is available as a new user account.

5. An apparatus according to claim 1, wherein the browser management control includes a browser user account expirer, to provide for the deletion of the browser user account.

6. An apparatus according to claim 5, wherein the browser user account expirer deletes a browser user account after a specified period of browser user account inactivity.

7. An apparatus according to claim 5, wherein the browser user account expirer deletes a browser user account after a specified period of time.

8. An apparatus according to claim 1, wherein the browser management control includes default browser user account settings to apply to a new browser user account.

9. An apparatus according to claim 1, wherein the browser user accounts include browser settings, browser history, browser bookmarks, and browser cache.

10. An apparatus according to claim 1, wherein the information about a user's use of a browser comprises at least one of the user's enablement or blocking of cookies and preferences regarding allowing or blocking of pop-up ads.

11. A method for allowing multiple users to access secure browser user accounts in a single operating system user account, the method comprising:
   receiving a request from one of a plurality of users to activate a multi-user web browser within the single operating system user account on a computer;
   utilizing a browser management control, wherein the browser management control is started by a browser account administrator, wherein the browser account administrator is logged into the single operating system account as the administrator, wherein the browser account administrator uses a stand-alone application separate from the multi-user web browser to choose settings to apply to each of the browser user accounts, then closes the browser account management control and stand-alone application, then logs out of the single operating system account as the administrator, then logs into the single operating system account as a default user before initializing a multi-user web browser session;
   receiving a browser user name and a password for the multi-user web browser;
   identifying a browser user account of the browser user accounts in a secure directory on the computer using the browser user name, the secure directory storing each of the browser user accounts separately from other browser user accounts and preventing access to non-administrator users of the computer, the browser user account storing information about the user's use of the browser;
   authenticating the browser user name and the password on the computer;
   retrieving browser user account settings from the browser user account in the secure directory on the computer;
   initializing the browser session in the multi-user web browser using the browser user account settings after authenticating the browser user name and password; and
   running the multi-user web browser session.

12. A method according to claim 11, further comprising creating a browser user account with the browser user name if the browser user account does not exist.

13. A method according to claim 12, wherein creating a browser user account includes:
   receiving a blank password; and
   associating the blank password with the browser user name.

14. A method according to claim 11, wherein creating a browser user account further includes:
   determining that the browser user account does not exist;
   notifying a user that the browser user account does not exist; and receiving from the user a request to create the browser user account.

15. A method according to claim 11, wherein retrieving browser user account settings includes:
   retrieving a browser history from the browser user account;
   retrieving browser bookmarks from the browser user account; and
   retrieving a browser cache from the browser user account.

16. A method according to claim 11, wherein initializing the multi-user web browser session includes:
   retrieving a browser history from a browser user account;
   retrieving browser bookmarks from a browser user account; and
   retrieving a browser cache from a browser user account.

17. A method according to claim 11, wherein identifying a browser user account in a secure directory includes identifying the browser user account in the secure directory on the computer using the browser user name after authenticating the browser user name and password, the secure directory preventing access to non-administrator users of the computer, the browser user account storing information about the user's use of the multi-user web browser, the information about a user's use of the multi-user web browser including at least one of the user's enablement or blocking of cookies and preferences regarding allowing or blocking of pop-up ads.

18. An article, comprising:
   a hardware storage medium, said storage medium having stored thereon instructions, that, when executed by a machine, result in:
   creating a plurality of browser user accounts;
   receiving a request from one of a plurality of users to activate a multi-user web browser within a single operating system user account on the machine;
   utilizing a browser management control, wherein the browser management control is started by a browser account administrator, wherein the browser account administrator is logged into the single operating system account as the administrator, wherein the browser account administrator uses a stand-alone application separate from the multi-user web browser to choose settings to apply to each of the browser user accounts, then closes the browser account management control and stand-alone application, then logs out of the single operating system account as the administrator, then logs into the single operating system account as a default user before initializing a multi-user web browser session;
   receiving a browser user name and password in a web browser;
   validating that the browser user name exists as a browser user account;
   authenticating the browser user name with the password on the computer;
   starting a user browser session in a web browser after authenticating the browser user name and password; and
   initializing the multi-user web browser session with browser account settings stored in a browser user account of plurality of browser user accounts in a secure directory on the computer, the secure directory storing each of the browser user accounts separately from other browser user accounts and preventing access to non-administrator users of the computer.

19. An article according to claim 18, further comprising creating a browser user account with the browser user name.

20. An article according to claim 19, wherein creating a browser user account includes:
   receiving a request from the user to create a browser user account; and
   determining that the browser user account does not already exist.

21. An article according to claim 19, wherein creating a browser user account includes:
   receiving a blank password; and
   associating the blank password with the browser user name.

22. An article according to claim 18, further comprising creating default browser account settings for newly created accounts.

23. An article according to claim 18, further comprising setting an expiration control to control deletion of the browser user accounts.

24. An article according to claim 18, wherein initializing the multi-user web browser session with browser account settings stored in a browser user account includes initializing the multi-user web browser session with browser account settings stored in the browser user account in the secure directory on the computer, the secure directory preventing access to non-administrator users of the computer, the browser account settings including at least one of the user's enablement or blocking of cookies and preferences regarding allowing or blocking of pop-up ads.

25. An apparatus, comprising:
- a computer;
- a multi-user web browser stored on the computer, accessible by a plurality of users within a single operating system account on the computer;
- a browser user account for the web browser for each of the plurality of users, the browser user account storing information about a user's use of the multi-user web browser;
- a browser management control, wherein the browser management control is started by a browser account administrator, wherein the browser account administrator is logged into the single operating system account as the administrator, wherein the browser account administrator uses a stand-alone application separate from the multi-user web browser to choose settings to apply to each of the plurality of browser user accounts, then closes the browser account management control and stand-alone application, then logs out of the single operating system account as the administrator, then logs into the single operating system account as a default user before starting a multi-user web browser;
- a secure directory to store each browser user account, the secure directory remote from the computer but accessible from the computer and preventing access to each browser user account from non-administrator users of the computer;
- a browser user name for each browser user account;
- a password associated with each of the browser user names;
- a validator on the computer to validate the browser user name; and
- an authenticator on the computer to authenticate that the password corresponds to the browser user name, wherein the apparatus is operative to load the browser user account after the password is authenticated as corresponding to the browser user name and before a multi-user web browser session is initialized.

26. An apparatus according to claim 25, wherein the browser management control includes a browser user account expirer, to provide for the deletion of a browser user account.

27. An apparatus according to claim 26, wherein the browser user account expirer deletes a browser user account after a specified period of browser user account inactivity.

28. An apparatus according to claim 26, wherein the browser user account expirer deletes a browser user account after a specified period of time.

29. An apparatus according to claim 25, wherein the browser management control includes default browser user account settings to apply to a new browser user account.

30. An apparatus according to claim 25, wherein each browser user account includes browser settings, browser history, browser bookmarks, and browser cache.

31. An apparatus according to claim 25, wherein the information about a user's use of a browser comprises at least one of the user's enablement or blocking of cookies and preferences regarding allowing or blocking of pop-up ads.

32. A method for allowing multiple users to access secure browser user accounts in a single operating system user account, the method comprising:
- receiving a request from one of a plurality of users to activate a multi-user web browser within the single operating system user account on a computer;
- utilizing a browser management control, wherein the browser management control is started by a browser account administrator, wherein the browser account administrator is logged into the single operating system account as the administrator, wherein the browser account administrator uses a stand-alone application separate from the multi-user web browser to choose settings to apply to each of the browser user accounts, then closes the browser account management control and stand-alone application, then logs out of the single operating system account as the administrator, then logs into the single operating system account as a default user before initializing a multi-user web browser session;
- receiving a browser user name and a password in a browser;
- identifying a browser user account of the browser user accounts stored in a secure directory using the browser user name, the secure directory remote from the computer but accessible from the computer and preventing access to the browser user accounts from non-administrator users of the computer;
- authenticating the browser user name and the password on the computer;
- retrieving browser user account settings from the browser user account in the secure directory;
- initializing a browser session in the browser using the browser user account settings after authenticating the browser user name and password; and
- running the multi-user web browser session.

33. A method according to claim 32, wherein retrieving browser user account settings includes:
- retrieving a browser history from a browser user account;
- retrieving browser bookmarks from a browser user account; and
- retrieving a browser cache from a browser user account.

34. A method according to claim 32, wherein retrieving browser user account settings from the browser user account in the secure directory includes retrieving the browser user account settings from the browser user account in the secure directory, the browser user account settings including at least one of the user's enablement or blocking of cookies and preferences regarding allowing or blocking of pop-up ads.

35. An article, comprising:
- a hardware storage medium, said storage medium having stored thereon instructions, that, when executed by a machine, result in:
- creating a plurality of browser user accounts;
- receiving a request from one of a plurality of users to activate a multi-user web browser within a single operating system user account on the machine;
- utilizing a browser management control, wherein the browser management control is started by a browser account administrator, wherein the browser account administrator is logged into the single operating system account as the administrator, wherein the browser account administrator uses a stand-alone application separate from the multi-user web browser to choose settings to apply to each of the browser user accounts, then closes the browser account management control and stand-alone application, then logs out of the single operating system account as the administrator, then logs into the single operating system account as a default user before initializing a multi-user web browser session;

receiving a browser user name and password in a web browser;

validating that the browser user name exists as a browser user account;

authenticating the browser user name with the password on the computer;

starting a user browser session in the multi-user web browser; and initializing the multi-user web browser session with browser account settings stored in a browser user account of browser user accounts in a secure directory after authenticating the browser user name and password, the secure directory remote from the computer but accessible from the computer and preventing access to the browser user accounts from non-administrator users of the computer.

36. An article according to claim 35, further comprising creating default browser account settings for newly created accounts.

37. An article according to claim 35, further comprising setting an expiration control to control deletion of the user account.

38. An article according to claim 35, wherein initializing the multi-user web browser session with browser account settings stored in a browser user account in a secure directory includes initializing the multi-user web browser session with the browser account settings stored in the browser user account in the secure directory, the secure directory remote from the computer but accessible from the computer and preventing access to the browser user accounts from non-administrator users of the computer, the browser account settings including at least one of the user's enablement or blocking of cookies and preferences regarding allowing or blocking of pop-up ads.

* * * * *